United States Patent
Jeon et al.

(10) Patent No.: US 9,514,882 B2
(45) Date of Patent: *Dec. 6, 2016

(54) MULTILAYER CERAMIC ELECTRONIC COMPONENT

(71) Applicant: SAMSUNG ELECTRO-MECHANICS CO., LTD., Suwon, Gyunggi-do (KR)

(72) Inventors: Byung Jun Jeon, Gyunggi-do (KR); Kyu Ha Lee, Gyunggi-do (KR); Hyun Hee Gu, Gyunggi-do (KR); Chang Hoon Kim, Gyunggi-do (KR); Myung Jun Park, Gyunggi-do (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 134 days.

This patent is subject to a terminal disclaimer.

(21) Appl. No.: 13/902,587

(22) Filed: May 24, 2013

(65) Prior Publication Data

US 2014/0233148 A1     Aug. 21, 2014

(30) Foreign Application Priority Data

Feb. 20, 2013  (KR) .................. 10-2013-0018274

(51) Int. Cl.
*H01G 4/30* (2006.01)
*H01G 4/005* (2006.01)
*H01G 4/12* (2006.01)
*H01G 4/012* (2006.01)
*H01G 4/232* (2006.01)

(52) U.S. Cl.
CPC ............... *H01G 4/12* (2013.01); *H01G 4/005* (2013.01); *H01G 4/012* (2013.01); *H01G 4/232* (2013.01); *H01G 4/30* (2013.01); *H01G 4/1227* (2013.01)

(58) Field of Classification Search
CPC ........................................... H01G 4/30
USPC ............................ 361/303, 306.1, 311, 301.4
See application file for complete search history.

(56) References Cited

U.S. PATENT DOCUMENTS

| | | | |
|---|---|---|---|
| 5,822,176 A * | 10/1998 | Sano ............... | H01G 4/1227 361/306.3 |
| 2005/0286208 A1 * | 12/2005 | Ito et al. .......... | 361/321.5 |
| 2008/0130198 A1 * | 6/2008 | Nakano et al. ..... | 361/303 |
| 2009/0009927 A1 * | 1/2009 | Iguchi ............. | H01G 4/30 361/321.5 |
| 2011/0069424 A1 * | 3/2011 | Shiota et al. ..... | 361/321.4 |
| 2014/0233149 A1 * | 8/2014 | Jeon et al. ....... | 361/301.4 |

FOREIGN PATENT DOCUMENTS

| | | |
|---|---|---|
| JP | 10-135063 | 5/1998 |
| JP | 2005-268290 A | 9/2005 |

* cited by examiner

*Primary Examiner* — Eric Thomas
(74) *Attorney, Agent, or Firm* — McDermott Will & Emery LLP

(57) ABSTRACT

There is provided a multilayer ceramic electronic component, including: a ceramic body having internal electrodes formed therein; external electrodes formed on external surfaces of the ceramic body and connected to the internal electrodes; and buffer layers formed on contact surfaces between the internal electrodes and the external electrodes, among external surfaces of the ceramic body, in an interior direction of the ceramic body, wherein when a thickness of the internal electrode is denoted by Te, a number of laminated internal electrodes is denoted by N, a thickness of the buffer layer is denoted by t, and a width of a margin of the ceramic body in a length direction of the ceramic body is denoted by L, Te≤0.6 μm, N>200, and 3 μm≤t<L, so that the occurrence of radial cracks can be prevented and thus reliability can be improved.

23 Claims, 1 Drawing Sheet

X-X'

MULTILAYER CERAMIC ELECTRONIC COMPONENT

CROSS-REFERENCE TO RELATED APPLICATIONS

This application claims the priority of Korean Patent Application No. 10-2013-0018274 filed on Feb. 20, 2013, in the Korean Intellectual Property Office, the disclosure of which is incorporated herein by reference.

BACKGROUND OF THE INVENTION

Field of the Invention

The present invention relates to a multilayer ceramic electronic component, and more particularly, to a multilayer ceramic electronic component having excellent reliability.

Description of the Related Art

As electronic products have tended to be miniaturized and high-functionalized, electronic components have correspondingly been required to have smaller sizes and higher degrees of capacitance. Due to the requirement for miniaturization and high amounts of capacitance in electronic components, multilayer ceramic electronic components are drawing attention as electronic components able to be miniaturized and provided with high levels of capacitance, and thus, demand for multilayer ceramic electronic components is increasing.

In order to realize miniaturization and high levels of capacitance in multilayer ceramic capacitors, internal electrodes thereof are required to be both thinned and laminated in large numbers.

In general, external electrodes provided on multilayer ceramic electronic components may contain a glass component, and the glass component may be diffused and penetrate into a ceramic body during a sintering procedure.

The diffusion of the glass component into the ceramic body may be increased in the case that an increased amount of internal electrodes is present in multilayer ceramic electronic components. The trend toward higher lamination amounts and thinning of internal electrodes may further increase the diffusion of the glass component into the ceramic body.

In the case in which the glass component present in the external electrodes is diffused into the internal electrodes, stress may occur, resulting in internal defects such as radial cracking and the like.

Related Art Document 1 discloses that a diffusion layer is provided on the entire surface of the ceramic body. Related Art Document 2 discloses that conductive portions having the same conductivity characteristics as those of external electrodes are included on portions of the outermost ceramic layers corresponding to positions of the external electrodes to thereby improve adhesion properties therebetween.

RELATED ART DOCUMENTS (Patent Document 1) Japanese Patent Laid-Open Publication No. 1998-135063
(Patent Document 2) Japanese Patent Laid-Open Publication No. 2005-268290

SUMMARY OF THE INVENTION

An aspect of the present invention provides a multilayer ceramic electronic component having excellent reliability.

According to an aspect of the present invention, there is provided a multilayer ceramic electronic component, including: a ceramic body having internal electrodes formed therein; external electrodes formed on external surfaces of the ceramic body and connected to the internal electrodes; and buffer layers formed on contact surfaces between the internal electrodes and the external electrodes, among external surfaces of the ceramic body, in an interior direction of the ceramic body, wherein when a thickness of the internal electrode is denoted by Te, a number of laminated internal electrodes is denoted by N, a thickness of the buffer layer is denoted by t, and a width of a margin of the ceramic body in a length direction of the ceramic body is denoted by L, Te≤0.6 μm, N>200, and 3 μm≤t<L.

Here, when a thickness of the external electrode is denoted by T, t/T<⅓.

The buffer layers may have a boron content of 50% or more.

The ceramic body may have a rectangular parallelepiped shape.

The internal electrodes may have a rectangular shape.

The external electrodes may be formed on end surfaces of the ceramic body.

The external electrodes may be extended to portions of upper, lower and side surfaces of the ceramic body.

The ceramic body may contain barium titanate or strontium titanate.

The external electrodes may contain glass.

Here, a diffusion rate of a conductive metal contained in the external electrodes may be greater than a diffusion rate of a conductive metal contained in the internal electrodes.

The internal electrodes may contain at least one selected from the group consisting of gold, silver, copper, nickel, palladium, platinum, and alloys thereof.

The external electrodes may contain at least one selected from the group consisting of gold, silver, palladium, copper, nickel, alloys thereof.

According to another aspect of the present invention, there is provided a multilayer ceramic electronic component, including: external electrodes including first and second external electrodes formed on end surfaces of a ceramic body; internal electrodes including first and second internal electrodes separated from each other and laminated in the interior of the ceramic body, the first and second internal electrodes being connected to the first and second external electrodes, respectively; and buffer layers formed from the end surfaces of the ceramic body in an interior direction of the ceramic body, wherein when a thickness of the internal electrode is denoted by Te, a number of laminated internal electrodes is denoted by N, a thickness of the buffer layer is denoted by t, and a width of a margin of the ceramic body in a length direction of the ceramic body is denoted by L, Te≤0.6 μm, N>200, and 3 μm≤t<L.

Here, when a thickness of the external electrode is denoted by T, t/T<⅓.

The buffer layers may have a boron content of 50% or more.

The ceramic body may have a rectangular parallelepiped shape.

The internal electrodes may have a rectangular shape.

The external electrodes may be extended to portions of upper, lower and side surfaces of the ceramic body.

The ceramic body may contain barium titanate or strontium titanate.

The external electrodes may contain glass.

Here, a diffusion rate of a conductive metal contained in the external electrodes may be greater than a diffusion rate of a conductive metal contained in the internal electrodes.

The internal electrodes may contain at least one selected from the group consisting of gold, silver, copper, nickel, palladium, platinum, and alloys thereof.

The external electrode may contain at least one selected from the group consisting of gold, silver, palladium, copper, nickel, alloys thereof.

According to another aspect of the present invention, there is provided a method of manufacturing a multilayer ceramic electronic component, the method including: preparing a paste for external electrodes, containing glass; forming external electrodes on a sintered chip, in which internal electrodes are laminated, by using the paste for external electrodes; and sintering the external electrodes by regulating a temperature increase rate at a softening point of the glass or higher to control thickness of buffer layers.

Here, a diffusion rate of a conductive metal contained in the external electrodes may be greater than a diffusion rate of a conductive metal contained in the internal electrodes.

The temperature increase rate may be increased to decrease the thickness of the buffer layers.

The temperature increase rate may be decreased to increase the thickness of the buffer layers.

According to another aspect of the present invention, there is provided a method of manufacturing a multilayer ceramic electronic component, the method including: preparing a paste for external electrodes, containing glass; forming external electrodes on a sintered chip, in which internal electrodes are laminated, by using the paste for external electrodes; and sintering the external electrodes, wherein in the preparing of the paste for external electrodes, thickness of buffer layers is controlled by regulating contents of an alkali metal and vanadium oxide contained in the glass.

Here, a diffusion rate of a conductive metal contained in the external electrodes may be greater than a diffusion rate of a conductive metal contained in the internal electrodes.

The alkali metal may be at least one selected from the group consisting of lithium (Li), sodium (Na), potassium (K), rubidium (Rb), and cesium (Cs).

The thickness of the buffer layers may be increased by increasing the contents of the alkali metal and the vanadium oxide.

The thickness of the buffer layers may be decreased by decreasing the contents of the alkali metal and the vanadium oxide.

Here, in the sintering of the external electrodes, the thickness of the buffer layers may be controlled by regulating a temperature increase rate at a softening point of the glass or higher.

The temperature increase rate may be increased to decrease the thickness of the buffer layers.

The temperature increase rate may be decreased to increase the thickness of the buffer layers.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
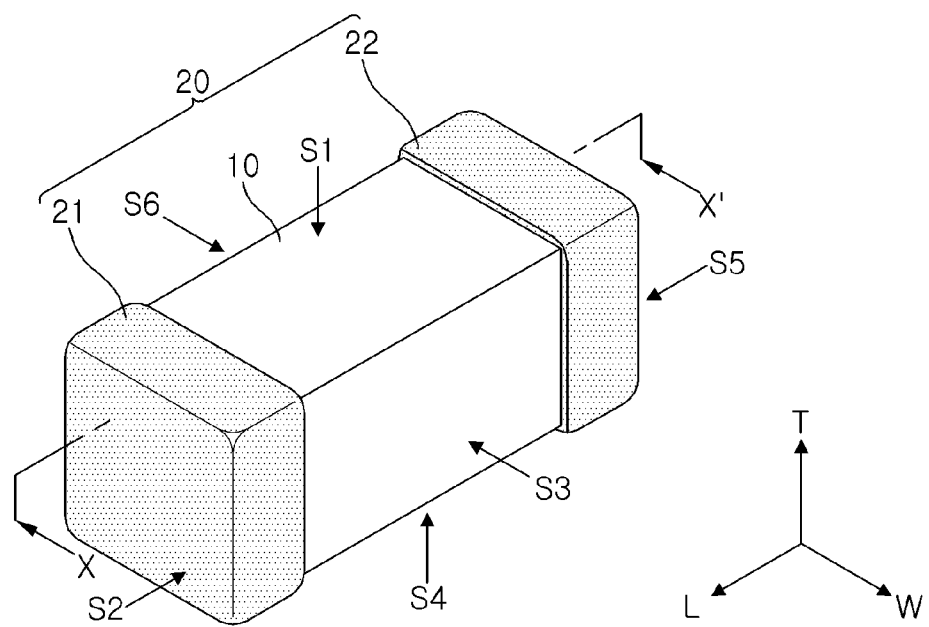
FIG. 1 is a perspective view of a multilayer ceramic electronic component according to an embodiment of the present invention.

Hereinafter, embodiments of the present invention will be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

Figure 2:
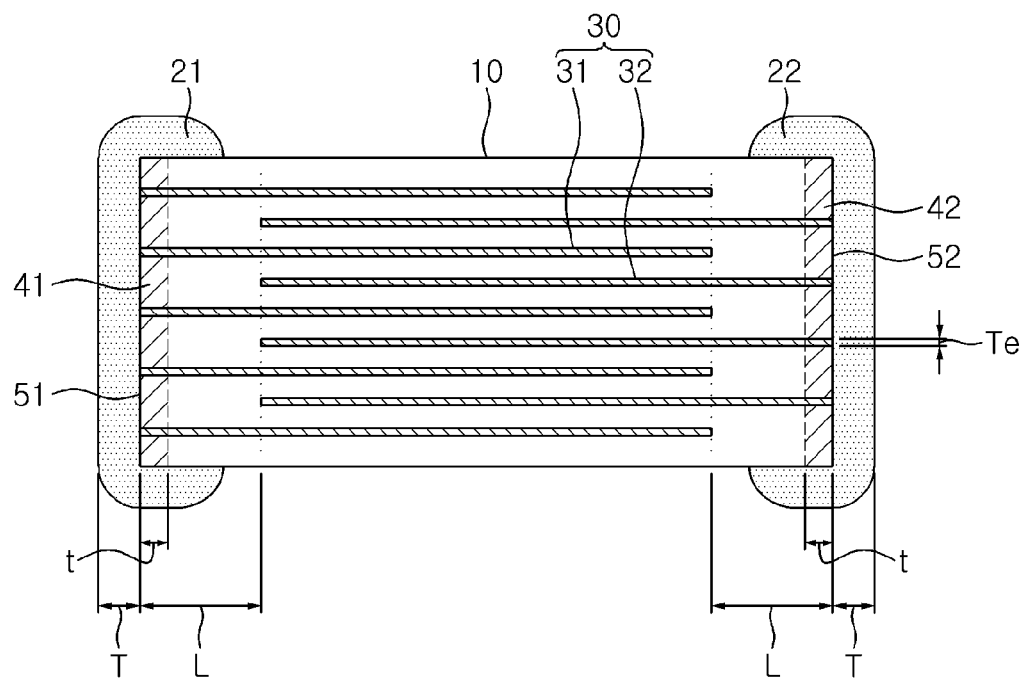
FIG. 2 is a cross-sectional view taken along line X-X' of FIG. 1.

FIG. 1 is a perspective view of a multilayer ceramic electronic component according to an embodiment of the present invention. FIG. 2 is a cross-sectional view taken along line X-X' of FIG. 1.

Referring to FIGS. 1 and 2, a multilayer ceramic electronic component according to an embodiment of the invention may include a ceramic body 10, internal electrodes 30 laminated in the interior of the ceramic body 10, external electrodes 20 formed on external surfaces of the ceramic body 10, and buffer layers 41 and 42 formed in the interior of the ceramic body.

The ceramic body 10 may have a rectangular parallelepiped shape. An "L direction", a "W direction", and a "T direction" may denote a "length direction", a "width direction", and a "thickness direction", respectively. Here, the thickness direction may refer to a direction in which the internal electrodes 30 are laminated. As for the ceramic body 10, the length is greater than the width thereof, and the width may be equal to the thickness thereof. The ceramic body 10 may have an upper surface S1, a lower surface S4, side surfaces S3 and S6, and end surfaces S2 and S5.

The ceramic body 10 may contain a dielectric material having high permittivity, specifically, barium titanate or strontium titanate. However, the invention is not limited thereto.

Since the dielectric material includes electric dipoles, it may be able to accumulate a greater amount of charge.

The external electrodes 20 may be formed outside the ceramic body 10, and specifically, may be formed on the end surfaces S2 and S5 in the length direction ("L direction") thereof. The external electrodes 20 may be extended to portions of the upper and lower surfaces S1 and S4 and the side surfaces S3 and S6 of the ceramic body 10.

The external electrodes 20 may include first and second external electrodes 21 and 22, and electrical charges having opposite polarities may be applied to the first and second external electrodes 21 and 22.

The external electrodes 20 may contain conductive metal and glass. The conductive metal may include at least one selected from the group consisting of gold, silver, palladium, copper, nickel, and alloys thereof.

The glass component may be added to fill pores formed in the external electrodes 20, and thus the compactness of the external electrodes 20 may be improved. When pores are present in the external electrodes 20, a plating liquid or the like may penetrate through the pores, resulting in deteriorated reliability of the electronic component.

The internal electrodes 30 may be laminated in the interior of the ceramic body 10, and may have, without limitation, a rectangular shape. The internal electrodes 30 may include first and second internal electrodes 31 and 32. The first and second internal electrodes 31 and 32 may be drawn out in opposing directions and respectively connected to the first and second external electrodes 21 and 22, so that the first and second internal electrodes 31 and 32 may be charged with electrical charges having opposite polarities.

The internal electrodes 30 may contain at least one selected from the group consisting of gold, silver, copper, nickel, palladium, platinum, and alloys thereof. However, the invention is not limited thereto, and any material that can impart conductivity to the internal electrodes 30 may be used without particular limitation.

The buffer layers 41 and 42 may be formed in an interior direction of the ceramic body 10 from contact surfaces 51 and 52 between the first and second internal electrodes 31 and 32 and the first and second external electrodes 21 and 22. The contact surfaces refer to surfaces of the ceramic body 10 on which the internal electrodes 30 contact the external electrodes 20 among external surfaces of the ceramic body 10.

The glass component contained in the external electrodes 20 may penetrate into the ceramic body 10 through a grain boundary of the ceramic body 10. The glass component penetrating into the ceramic body 10 may dissolve an oxide constituting the ceramic body 10, and thus the buffer layers 41 and 42 of glassy phase may be formed.

The buffer layers 41 and 42 may be higher than the ceramic body 10 in light of contents of elements constituting the glass component. The elements constituting the glass component may be mainly silicon (Si), boron (B), and the like, which can form a glass network structure.

In another aspect, the buffer layers 41 and 42 may be lower than the ceramic body 10 in light of a content of barium (Ba). The ceramic body 10 is mainly composed of barium titanate and the glass component from the external electrodes 20 penetrates into the ceramic body 10, and thus the content of barium (Ba) may be relatively reduced.

The buffer layers 41 and 42 may be defined as a region in which boron (B), which is one of the elements constituting the glass component and is absent in a ceramic base material, is detected. In order to determine the thickness of the buffer layers 41 and 42, related with prevention of radial cracks, it is preferable to define the region in which boron (B) is detected as the buffer layers 41 and 42.

The thickness (t) of the buffer layer 41 and 42 may be the width of the buffer layers 41 and 42, measured from the end surfaces S2 and S5 of the ceramic body 10.

The thickness (t) of the buffer layers 41 and 42 may be measured by scanning from the end surface S2 or S5 of the ceramic body 10 in the length direction of the ceramic body 10, using EPMA, EDX, or the like. That is, the thickness (t) of the buffer layers 41 and 42 may be determined by a distance from the end surfaces of the ceramic body 10 to the region in which boron (B) is detected.

The thickness (t) of the buffer layers 41 and 42 may be an average value. The thickness (t) of the buffer layer may be determined by measuring thickness values thereof at 10 equidistant points on an image obtained by scanning a cross section of the ceramic body 10 taken in length and thickness directions (L-T directions) of the ceramic body 10 using a scanning electron microscope, and then averaging the measured values.

In the present embodiment, the thickness (Te) of the internal electrodes 30 may be less than or equal to 0.6 μm, and the number (N) of laminated internal electrodes 30 may be 200 or more. That is, Te≤0.6 μm and N>200 may be satisfied.

As the internal electrodes 30 are thinned and the number of laminated internal electrodes 30 is increased, radial cracks may occur. The invention is provided to solve the problem that radial cracks occur when the thickness (Te) of the internal electrodes 30 is less than or equal to 0.6 μm and the number (N) of laminated internal electrodes 30 is greater than 200.

As the internal electrodes 30 are thinned and the number of laminated internal electrodes 30 is increased, radial cracks may occur. This may be described as follows.

A diffusion rate of the conductive metal contained in the external electrodes 20 may be greater than a diffusion rate of a conductive metal contained in the internal electrodes 30. Specifically, in the case in which copper is contained in the external electrodes 20 and nickel is contained in the internal electrodes 30, a diffusion rate of copper is greater than that of nickel.

In a sintering process, copper from the external electrodes 20 may be diffused into the internal electrodes 30 and nickel from the internal electrodes 30 may also be diffused into the external electrodes 20, to form a copper-nickel alloy. Since the diffusion rate of copper is faster than the diffusion rate of nickel, the volume of the internal electrodes 30 may further expand. Due to this difference in volume, stress may be induced in the ceramic body 10. When the stress exceeds a critical value, radial cracks may occur in the ceramic body 10.

Eventually, in the case in which the diffusion rate of the metal element of the external electrodes 20 is greater than that of the metal element of the internal electrodes 30, stress may occur in the ceramic body 10, due to the difference in volume, caused by the inter-diffusion of the metal elements between the internal electrodes 30 and the external electrodes 20.

As the internal electrodes 30 are thinned and greater numbers of internal electrodes 30 are laminated, the difference in volume caused by the inter-diffusion of the metal elements between the internal electrodes 30 and the external electrodes 20 may be increased. Therefore, the stress induced in the ceramic body 10 may be further increased, and more radial cracks may occur.

The thickness (Te) of the internal electrodes 30 may be an average value. The thickness (Te) of the internal electrode 30 may be determined by measuring thickness values thereof at 10 equidistant points on an image obtained by scanning a cross section of the ceramic body 10 taken in the length and thickness directions (L-T directions) cut in a central portion of the ceramic body 10 in the width direction (W direction) using a scanning electron microscope, and then averaging the measured values.

The central portion of the ceramic body 10 may refer to a region within 22.5% of the width of the ceramic body 10 from a center point of the ceramic body 10 toward either side thereof in the width direction (W direction). Within the above range, the average thickness (Te) of the internal electrodes 30 may be stable.

In the present embodiment, the thickness (t) of the buffer layers 41 and 42 may be greater than or equal to 3 μm but less than a width (L) of a margin of the ceramic body 10 in the length direction of the ceramic body 10. That is, 3 μm≤t<L may be satisfied.

The buffer layers 41 and 42 may function to reduce stress occurring due to the inter-diffusion of the metal elements between the internal electrodes 30 and the external electrodes 20.

The difference in volume due to the inter-diffusion of the metal elements between the internal electrodes 30 and the external electrodes 20 may induce stress in the ceramic body 10. At the same time, the glass component contained in the external electrodes also penetrates into the grain boundary of the ceramic body 10 to thereby dissolve the oxide constituting the ceramic body 10.

Even in the case that stress occurs in the ceramic body 10 due to the inter-diffusion of the metal elements between the internal electrodes 30 and the external electrodes 20, a portion of the ceramic body 10 is dissolved to have a liquid phase, and thus, stress may be reduced in the liquid phase portion of the ceramic body 10.

Eventually, in the case of t<3 μm, the buffer layers 41 and 42 fail to reduce the stress induced by the inter-diffusion of nickel and copper between the internal electrodes 30 and the external electrodes 20, and thus radial cracks may occur in the ceramic body 10.

In the case of t≥L, insulation resistance is reduced, resulting in deteriorated reliability.

With reference to FIG. 2, the case in which the thickness (t) of the buffer layers 41 and 42 is greater than or equal to the width (L) of the margin of the ceramic body 10 in the length direction of the ceramic body may refer to a case in which the first buffer layer 41 is connected to the second internal electrode 32 or a case in which the second buffer layer 42 is connected to the first internal electrode 31.

The buffer layers 41 and 42 correspond to regions in which the glass component of the external electrodes 20 penetrates into the ceramic body 10, and thus may have lower insulation resistance than the ceramic body 10 formed of barium titanate. That is, insulation resistance may be degraded due to the glass component.

Therefore, at the time of using for a long period of time, insulating properties may be degraded, resulting in accelerated deterioration, and thus reliability may not be secured.

In the present embodiment, a ratio of the thickness (t) of the buffer layers 41 and 42 to thickness (T) of the external electrodes 20, t/T, may be less than ⅓.

In the case in which the ratio of the thickness (t) of the buffer layers 41 and 42 to the thickness (T) of the external electrodes 20, t/T, is ⅓ or greater, reliability may be deteriorated.

The case in which the ratio of the thickness (t) of the buffer layers 41 and 42 to the thickness (T) of the external electrodes 20, t/T, is ⅓ or greater, may refer to a case in which a large amount of glass contained in the external electrodes 20 penetrates or diffuses into the ceramic body 10 to form a relatively thick buffer layer.

The glass component contained in the external electrodes 20 penetrates or diffuses toward the ceramic body 10, and thus the content of glass may be decreased in the external electrodes 20, and more pores may be present in the external electrodes 20 to decrease the compactness thereof.

In the case in which the compactness of the external electrodes 20 is decreased, a plating liquid may penetrate through the external electrodes 20, resulting in deteriorating reliability.

This phenomenon may be worse as the thickness (T) of the external electrodes 20 is reduced. When the external electrodes 20 are thick, the content of glass is increased, and thus the ratio of the thickness (t) of the buffer layers 41 and 42 to the thickness (T) of the external electrodes 20 is determined as a parameter.

This may denote a standard for the content of glass, necessary for the external electrodes 20 to prevent the decrease in the compactness of the external electrodes 20. That is, when the glass component is removed from the external electrodes 20 to thereby increase the thickness (t) of the buffer layers 41 and 42, the compactness of the external electrodes 20 is decreased and thus, reliability is deteriorated.

The thickness (T) of the external electrodes 20 may refer to the width of the external electrodes from the end surfaces S2 and S5 of the ceramic body 10 in the length direction of the ceramic body 10, as for the external electrodes 20 formed on the end surfaces S2 and S5 of the ceramic body 10.

The thickness (T) of the external electrodes 20 may be an average value. The thickness (T) of the external electrode 20 may be determined by measuring thickness values at 10 equidistant points in a portion of the external electrode corresponding to a central portion of the ceramic body 10 in the thickness direction (T direction) on an image obtained by scanning a cross section of the ceramic body 10 taken in the length and thickness directions (L-T directions) cut in a central portion of the ceramic body 10 in the width direction (W direction) using a scanning electron microscope, and then averaging the measured values.

Here, the central portion of the ceramic body in the width direction may refer to a region within 15% of the width of the ceramic body 10 from a center point of the ceramic body 10 toward either side thereof in the width direction of the ceramic body. Within the above range, the average thickness (T) of the external electrodes 20 may be stable.

The central portion of the ceramic body in the thickness direction may refer to a region corresponding to a fifth internal electrode 30 from a center point of the ceramic body 10 toward either side thereof in the thickness direction of the ceramic body.

Hereinafter, the control of the thickness (t) of the buffer layers 41 and 42 will be described in light of process conditions and glass composition.

First, in light of the process conditions, the thickness (t) of the buffer layers 41 and 42 may be controlled by regulating a retention time at a softening point of glass or higher in the sintering process of the external electrodes 20. Specifically, the thickness (t) of the buffer layers 41 and 42 may be controlled by regulating a temperature increase rate at the softening point of glass or higher.

At the softening point of glass or lower, glass has no fluidity and thus cannot penetrate or diffuse into the ceramic body 10. At the softening point of glass or higher, glass has fluidity and thus can penetrate or diffuse into the ceramic body 10.

When the temperature increase rate is decreased to thereby increase the retention time at the softening point of glass or lower, or the temperature increase rate is rapidly raised to thereby decrease the retention time at the softening point of glass or higher, the thickness (t) of the buffer layers 41 and 42 may be decreased. On the contrary, when the temperature increase rate is controlled to be slow at the softening point of glass or higher to thereby increase the retention time, the thickness (t) of the buffer layers 41 and 42 may be increased.

Second, in light of the glass composition, the thickness (t) of the buffer layers may be controlled by regulating contents of an alkali metal and vanadium oxide.

The use of glass having large contents of an alkali metal and vanadium oxide may further increase the thickness (t) of the buffer layers 41 and 42. The reason is that the softening point of glass may be lowered as the contents of the alkali metal and the vanadium oxide are increased, resulting in increasing the fluidity of glass and allowing the penetration or diffusion of glass to be more active.

On the contrary, when glass having small contents of an alkali metal and vanadium oxide is used, the fluidity of glass is low, making the penetration or diffusion of glass difficult, and thus, the thickness (t) of the buffer layers 41 and 42 may be decreased.

According to another embodiment of the invention, there is provided a method of manufacturing a multilayer ceramic electronic component, the method including: preparing a paste for external electrodes, containing glass; forming external electrodes 20 on a sintered chip, in which internal electrodes 30 are laminated, by using the paste for external electrodes; and sintering the external electrodes 20 while regulating a temperature increase rate at a softening point of the glass or higher to control thickness of buffer layers 41 and 42.

First, the paste for external electrodes may be prepared by mixing a conductive metal powder for imparting conductivity to the external electrodes 20, a glass powder for attaining compactness of the external electrodes 20, ethanol as an organic solvent, and polyvinyl butyral as a binder, followed by ball milling.

Then, the external electrodes 20 may be formed on the sintered chip by a dipping method or a printing method, using the paste for external electrodes.

The sintered chip may be manufactured as follows. That is, ceramic green sheets may be prepared by using a ceramic slurry containing a ceramic powder having high permittivity such as barium titanate. The internal electrodes 30 are, respectively, printed on the ceramic green sheets by using a paste for internal electrodes containing a conductive metal such as nickel or the like. The ceramic green sheets on which the internal electrodes 30 are printed are laminated to prepare a green sheet laminate. The green sheet laminate is cut into green chips, which are then sintered to produce respective sintered chips in which the internal electrodes 30 are laminated.

A diffusion rate of the conductive metal contained in the external electrodes 20 may be greater than a diffusion rate of the conductive metal contained in the internal electrodes 30.

The inter-diffusion of the metal elements between the internal electrodes 30 and the external electrodes 20 may cause a difference in volume, and thus radial cracks may occur. The invention is provided to solve this problem.

Then, in the sintering of the external electrodes 20, a temperature increase rate is regulated at a softening point of glass or higher, to thereby control the thickness (t) of the buffer layers 41 and 42.

At the softening point of glass or lower, glass has no fluidity and thus cannot penetrate or diffuse into the ceramic body 10. At the softening point or higher, glass has fluidity and thus can penetrate or diffuse into the ceramic body 10.

When the temperature increase rate is decreased to thereby increase a retention time at the softening point of glass or lower, or the temperature increase rate is rapidly raised to thereby decrease the retention time at the softening point of glass or higher, the thickness (t) of the buffer layers 41 and 42 may be decreased. On the contrary, when the temperature increase rate is controlled to be slow at the softening point of glass or higher to thereby increase the retention time, the thickness (t) of the buffer layers 41 and 42 may be increased.

Other descriptions of the ceramic powder, the external electrodes 20, the internal electrodes 30, and the buffer layers 41 and 42 are the same as those in the above embodiment.

According to another embodiment of the invention, there is provided a method of manufacturing a multilayer ceramic electronic component, the method including: preparing a paste for external electrodes, containing glass; forming external electrodes 20 on a sintered chip, in which internal electrodes 30 are laminated, by using the paste for external electrodes; and sintering the external electrodes 20, wherein in the preparing of the paste for external electrodes, thickness of buffer layers 41 and 42 is controlled by regulating contents of an alkali metal and vanadium oxide contained in the glass.

First, a paste for external electrodes may be prepared by mixing a conductive metal powder for imparting conductivity to the external electrodes 20, a glass powder for attaining compactness of the external electrodes 20, ethanol as an organic solvent, and polyvinyl butyral as a binder, followed by ball milling.

Then, the external electrodes 20 may be formed on a sintered chip by a dipping method or a printing method, using the paste for external electrodes.

Descriptions thereof are the same as those in the above embodiment.

Then, the buffer layers 41 and 42 may be formed in the interior of the ceramic body 10 by sintering the external electrodes 20. In the sintering of the external electrodes 20, the glass contained in the external electrodes 20 diffuses or penetrates into the ceramic body 10 to form the buffer layers 41 and 42.

In the preparing of the paste for external electrodes, the thickness (t) of the buffer layers 41 and 42 may be controlled by regulating contents of alkaline metal and vanadium oxide contained in the glass.

The use of glass having large contents of an alkali metal and vanadium oxide may further increase the thickness (t) of the buffer layers 41 and 42. Here, a softening point of glass may be lowered as the contents of the alkali metal and the vanadium oxide are increased, resulting in increasing the fluidity of glass and allowing the penetration or diffusion of glass to be more active.

On the contrary, when glass having small contents of an alkali metal and vanadium oxide is used, the fluidity of glass is low, making the penetration or diffusion of glass difficult, and thus, the thickness (t) of the buffer layers 41 and 42 may be decreased.

Specifically, the alkali metal may be at least one selected from the group consisting of lithium (Li), sodium (Na), potassium (K), rubidium (Rb), and cesium (Cs).

A diffusion rate of the conductive metal contained in the external electrodes 20 may be greater than a diffusion rate of the conductive metal contained in the internal electrodes 30. Descriptions thereof are the same as those in the above embodiment.

In addition, in the sintering process, the thickness (t) of the buffer layers 41 and 42 may be controlled by regulating a temperature increase rate at a softening point of glass or higher.

Descriptions thereof are the same as those in the above embodiment.

Other descriptions of the external electrodes 20, the internal electrodes 30, and the buffer layers 41 and 42 are the same as those in the above embodiment.

Hereinafter, the present invention will be described in detail, with reference to inventive examples and comparative examples.

Multilayer ceramic capacitors according to inventive examples and comparative examples were manufactured by the following method.

A barium titanate powder, ethanol as an organic solvent, and polyvinylbutyral as a binder were mixed, followed by ball milling, thereby preparing a ceramic slurry, and ceramic green sheets were prepared by using the ceramic slurry.

A conductive paste for internal electrodes containing nickel was printed on the ceramic green sheets, to form internal electrodes 30 thereon. The resultant sheets were laminated to produce a laminate, and the laminate was then subjected to isostatic pressing with a pressure of 1,000 kgf/cm$^2$ at 85° C.

The compressed laminate was cut into green chips, which were then subjected to a debindering process in which they were maintained at 230° C. under an air atmosphere for 60 hours. Each green chip was sintered at 950° C., to produce a sintered chip. Sintering was performed under a reducing atmosphere to thereby prevent oxidation of the internal electrodes 30. The reducing atmosphere was set to $10^{-11} \sim 10^{-10}$ atm, which was lower than Ni/NiO equilibrium oxygen partial pressure.

External electrodes 20 were formed on external surfaces of the sintered chip by using a paste for external electrodes containing a copper powder and a glass powder, and sintered at 780° C. Nickel plating layers and tin plating layers were formed on the external electrodes 20 through electroplating.

First, in order to check the occurrence of radial cracks in consideration of the thickness (Te) of the internal electrodes 30 and the number (N) of laminated internal electrodes, multilayer ceramic capacitors of 0603 size were manufactured by varying the thickness (Te) of the internal electrodes 30 and the number (N) of laminated internal electrodes. Then, a cross section of each multilayer ceramic capacitor was observed by using a high-magnification microscope, to thereby determine the occurrence or non-occurrence of radial cracks. 0603 size is referred to as a case in which a multilayer ceramic capacitor has a size of 0.6 mm×0.3 mm×0.3 mm.

TABLE 1

| Te (μm) | N | Cracks |
|---|---|---|
| 5 | 100 | Did Not Occur |
|   | 200 | Did Not Occur |
|   | 300 | Did Not Occur |
| 4 | 100 | Did Not Occur |
|   | 200 | Did Not Occur |
|   | 300 | Did Not Occur |
| 3 | 100 | Did Not Occur |
|   | 150 | Did Not Occur |
|   | 200 | Occurred |
|   | 250 | Occurred |
|   | 300 | Occurred |
| 2 | 100 | Did Not Occur |
|   | 150 | Did Not Occur |
|   | 200 | Occurred |
|   | 250 | Occurred |
|   | 300 | Occurred |

Referring to Table 1, in the case in which the thickness (Te) of the internal electrodes 30 was 4 μm and 5 μm, radial cracks did not occur regardless of the number of laminated internal electrodes 30.

It may be confirmed that radial cracks occurred when the thickness (Te) of the internal electrodes 30 was 3 μm or smaller and the number (N) of laminated internal electrodes 30 was 200 or more.

The present invention is to improve reliability by preventing radial cracks occurring when the thickness (Te) of the internal electrodes 30 is 3 μm or smaller and the number (N) of laminated internal electrodes 30 is 200 or more.

Then, in order to confirm appropriateness of the thickness (t) of the buffer layers 41 and 42, the thickness (t) of the buffer layers 41 and 42 was varied by setting a width (L) of a margin in the length direction of the ceramic body 10 to 60 μm and regulating the temperature increase rate.

The cross section of the sample was observed by a high-magnification microscope, to determine crack occurrence or non-occurrence. A reliability test was performed on other samples, which were manufactured under the same conditions as the sample in which cracks did not occur. The reliability test was carried out using an accelerated lifespan method. It was determined to be good in the case in which insulation resistance was 1E+07 Ωcm or higher. Results about cracks and reliability are shown in Table 2.

The accelerating lifespan evaluation was performed on 40 samples under conditions of 130° C., 2 Vr, and 4 hours.

TABLE 2

|  | L (μm) | t (μm) | Cracks | Reliability |
|---|---|---|---|---|
| Comparative Example 1 | 10 | 1 | Occurred | — |
| Comparative Example 2 |  | 2 | Occurred | — |
| Inventive Example 1 |  | 3 | Did Not Occur | Good |
| Inventive Example 2 |  | 4 | Did Not Occur | Good |
| Inventive Example 3 |  | 5 | Did Not Occur | Good |
| Inventive Example 4 |  | 7 | Did Not Occur | Good |
| Comparative Example 3 |  | 10 | Did Not Occur | Bad |
| Comparative Example 4 |  | 15 | Did Not Occur | Bad |
| Comparative Example 5 |  | 20 | Did Not Occur | Bad |

Referring to Table 2, cracks occurred in Comparative Examples 1 and 2 in which the thickness (t) of the buffer layers 41 and 42 was 1 μm and 2 μm, respectively, due to the thickness (t) of the buffer layers 41 and 42 being too small, failing to reduce stress caused by the inter-diffusion of the metal elements between the internal electrodes 30 and the external electrodes 20.

In Inventive Examples 1 to 4 in which the thickness (t) of the buffer layers 41 and 42 was 3 μm, 4 μm, 5 μm, and 7 μm, respectively, cracks did not occur and the reliability test results were also good.

In Comparative Examples 3 to 5 in which the thickness (t) of the buffer layers 41 and 42 was 10 μm, 15 μm, and 20 μm, respectively, cracks did not occur but the reliability test results were all bad. The reason is that the thickness (t) of the buffer layers 41 and 42 was equal to or greater than the width (L) of the margin in the length direction of the ceramic body 10, resulting in reducing insulation resistance.

According to Table 2, in the case in which the thickness (t) of the buffer layers 41 and 42 was 3 μm or greater but less than the width (L) of the margin in the length direction of the ceramic body 10, cracks did not occur and the reliability test results were good.

Then, in order to confirm appropriateness of a ratio (t/T) of the thickness (t) of the buffer layers 41 and 42 to the thickness (T) of the external electrodes 20, the thickness (t) of the buffer layers 41 and 42 was set to be 5 μm and the thickness (T) of the external electrodes 20 was varied. The reliability test was conducted, and the results are shown in Table 3. As a result of the reliability test, when insulation resistance was not reduced to 1E+07 Ωcm or lower, reliability was determined to be good. The accelerated lifespan evaluation was performed on 40 samples under conditions of 130° C., 2 Vr, and 4 hours.

TABLE 3

|  | t (μm) | T (μm) | t/T | Reliability |
|---|---|---|---|---|
| Comparative Example 6 | 5 | 10 | 1/2 | Bad |
| Comparative Example 7 |  | 12 | 5/12 | Bad |
| Inventive Example 5 |  | 15 | 1/3 | Good |
| Inventive Example 6 |  | 20 | 1/4 | Good |
| Inventive Example 7 |  | 25 | 1/5 | Good |

Referring to Table 3, in Comparative Examples 6 and 7 in which t/T was ½ and 5/12, respectively, reliability was deteriorated. The reason is that the amount of glass diffusing or penetrating into the ceramic body 10 was excessively large, and thus, the content of glass present in the external electrodes 20 was extremely reduced, resulting in decreased compactness of the external electrodes 20. A plating liquid or the like penetrates through pores of the external electrodes 20, resulting in deteriorating reliability.

In Inventive Examples 5 to 7 in which t/T was ⅓, ¼, and ⅕, respectively, reliability was good. The reason is that the content of glass present in the external electrodes 20 is sufficient, and thus the external electrodes 20 are maintained to be compact, so that the plating liquid or the like cannot penetrate therethrough.

According to the results shown in Table 3, it may be confirmed that the ratio (t/T) of the thickness (t) of the buffer layers 41 and 42 to the thickness (T) of the external electrodes 20 needs to be ⅓ or smaller, so that the compactness of the external electrodes 20 may not be reduced and the plating liquid or the like may be prevented from penetrating therethrough.

As set forth above, according to embodiments of the invention, a multilayer ceramic electronic component has excellent reliability by preventing radial cracks.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component, comprising:
   a ceramic body having internal electrodes formed therein;
   external electrodes formed on external surfaces of the ceramic body and connected to the internal electrodes; and
   buffer layers formed on contact surfaces between the internal electrodes and the external electrodes, among external surfaces of the ceramic body, in an interior direction of the ceramic body,
   wherein each of the buffer layers has a lower content of barium than that of the ceramic body,
   wherein when a thickness of each internal electrode is denoted by Te, a number of laminated internal electrodes is denoted by N, a thickness of the buffer layer is denoted by t, and a width of a margin of the ceramic body in a length direction of the ceramic body is denoted by L, Te≤0.6 μm, N>200, and 3 μm≤t<L.

2. The multilayer ceramic electronic component of claim 1, wherein when a thickness of each external electrode is denoted by T, t/T<⅓.

3. The multilayer ceramic electronic component of claim 1, wherein the buffer layers have a boron content of 50% or more.

4. The multilayer ceramic electronic component of claim 1, wherein the ceramic body has a rectangular parallelepiped shape.

5. The multilayer ceramic electronic component of claim 1, wherein the internal electrodes have a rectangular shape.

6. The multilayer ceramic electronic component of claim 1, wherein the external electrodes are formed on end surfaces of the ceramic body.

7. The multilayer ceramic electronic component of claim 1, wherein the external electrodes are extended to portions of upper, lower and side surfaces of the ceramic body.

8. The multilayer ceramic electronic component of claim 1, wherein the ceramic body contains barium titanate or strontium titanate.

9. The multilayer ceramic electronic component of claim 1, wherein the external electrodes contain glass.

10. The multilayer ceramic electronic component of claim 1, wherein a diffusion rate of a conductive metal contained in the external electrodes is greater than a diffusion rate of a conductive metal contained in the internal electrodes.

11. The multilayer ceramic electronic component of claim 1, wherein the internal electrodes contain at least one selected from the group consisting of gold, silver, copper, nickel, palladium, platinum, and alloys thereof.

12. The multilayer ceramic electronic component of claim 1, wherein the external electrodes contain at least one selected from the group consisting of gold, silver, palladium, copper, nickel, alloys thereof.

13. A method of manufacturing a multilayer ceramic electronic component, the method comprising:
    preparing a paste for external electrodes, containing glass;
    forming external electrodes on a sintered chip, in which internal electrodes are laminated, by using the paste for external electrodes; and
    sintering the external electrodes by regulating a temperature increase rate at a softening point of the glass or higher to control thickness of buffer layers,
    wherein increase of the temperature increase rate decreases the thickness of the buffer layers, and decrease of the temperature increase rate increases the thickness of the buffer layers.

14. The method of claim 13, wherein a diffusion rate of a conductive metal contained in the external electrodes is greater than a diffusion rate of a conductive metal contained in the internal electrodes.

15. A method of manufacturing a multilayer ceramic electronic component, the method comprising:
    preparing a paste for external electrodes, containing glass;
    forming external electrodes on a sintered chip, in which internal electrodes are laminated, by using the paste for external electrodes; and
    sintering the external electrodes,
    wherein in the preparing of the paste for external electrodes, thickness of buffer layers is controlled by regulating contents of an alkali metal and vanadium oxide contained in the glass.

16. The method of claim 15, wherein a diffusion rate of a conductive metal contained in the external electrodes is greater than a diffusion rate of a conductive metal contained in the internal electrodes.

17. The method of claim 15, wherein the alkali metal is at least one selected from the group consisting of lithium (Li), sodium (Na), potassium (K), rubidium (Rb) and cesium (Cs).

18. The method of claim 15, wherein the thickness of the buffer layers is increased by increasing the contents of the alkali metal and the vanadium oxide.

19. The method of claim 15, wherein the thickness of the buffer layers is decreased by decreasing the contents of the alkali metal and the vanadium oxide.

20. The method of claim 15, wherein in the sintering of the external electrodes, the thickness of the buffer layers is controlled by regulating a temperature increase rate at a softening point of the glass or higher.

21. The method of claim 20, wherein the temperature increase rate is increased to decrease the thickness of the buffer layers.

22. The method of claim 20, wherein the temperature increase rate is decreased to increase the thickness of the buffer layers.

23. A multilayer ceramic electronic component, comprising:
- a ceramic body having internal electrodes formed therein;
- external electrodes formed on external surfaces of the ceramic body and connected to the internal electrodes; and
- buffer layers formed on contact surfaces between the internal electrodes and the external electrodes, among external surfaces of the ceramic body, in an interior direction of the ceramic body,
- wherein each of the buffer layers has a boron content of 50% or more.

* * * * *